United States Patent [19]

Reneau

[11] Patent Number: 4,606,142
[45] Date of Patent: Aug. 19, 1986

[54] ELEVATED GAME BLIND

[76] Inventor: Charles F. Reneau, 2124 Marnel St., Houston, Tex. 77055

[21] Appl. No.: 693,247

[22] Filed: Jan. 22, 1985

[51] Int. Cl.⁴ ........................................... A01M 31/02
[52] U.S. Cl. ......................................... 43/1; 52/263; 52/280
[58] Field of Search ...................... 52/194, 236.3, 263, 52/648, 280, 79.5; 43/1 X; 446/476, 478; 108/151, 156

[56]     References Cited
U.S. PATENT DOCUMENTS

| 566,552 | 8/1896 | Weidman | 52/648 |
|---|---|---|---|
| 936,007 | 10/1909 | Mauborgne | 108/156 |
| 1,978,650 | 10/1934 | Shannon | 108/156 |
| 2,546,436 | 3/1951 | Green | 108/156 |
| 2,854,705 | 10/1958 | McClaran | 52/194 |
| 3,018,857 | 1/1962 | Parham | 43/1 |
| 4,412,398 | 11/1983 | Harmon | 43/1 |

FOREIGN PATENT DOCUMENTS 684110  9/1979  U.S.S.R. .............................. 52/79.5

Primary Examiner—John E. Murtagh
Assistant Examiner—Caroline Dennison
Attorney, Agent, or Firm—G. Turner Moller

[57]     ABSTRACT

A game blind comprises upper and lower sections which telescope relative to one another between an expanded hunting position and a collapsed storage position. The hunter's compartment is elevated above ground level by a plurality of legs received in brackets. The legs are free from significant cross bracing thereby minimizing the cost of the blind and enhancing the ease of assembly and erection.

11 Claims, 4 Drawing Figures

ELEVATED GAME BLIND

This invention relates to an elevated game blind of the type which is commonly known as a deer blind even though other types of game may be hunted therefrom.

Deer blinds normally comprise a small compartment of sufficient size to accommodate one or two hunters. The compartment includes a floor, a roof, and four walls. Each of the walls normally includes an opening or openable window through which the hunter may look and shoot. The conventional deer blind is elevated substantially above ground level by a latticework of legs and braces. Typically, the deer blind is erected at the site with the compartment on the ground and the blind is then tilted to its normal upright position. The disclosure in U.S. Pat. No. 2,854,705 is exemplary of conventional deer blinds.

Avid hunters and those who have erected many deer blinds will appreciate that the assembly of the legs and bracings is an aggravating and time consuming chore. It will also be evident that the bracings, fasteners and fastener openings comprise a significant expense in a deer blind. As will be more fully evident as this description proceeds, one of the principle features of this invention is a deer blind which is exceedingly easy to assemble and erect and which eliminates the need for cross bracing between the deer blind legs.

Other problems exist with deer blinds of conventional type. For example, deer blinds are bulky and somewhat difficult to transport in an open truck since they present substantial surfaces to the wind. Once erected in the field, deer blinds often become the home for owls, skunks and other varmints.

In summary, the game blind of this invention comprises a hunter's compartment having a base from which a plurality of legs extend thereby elevating the hunter's compartment above the ground. The legs are free from substantial cross bracing and connect with the hunter's compartment through a bracket which positions the legs in a downwardly diverging relation. The bracket comprises a plate affixed to the hunter's compartment and a section of square tubing which receives the end of the leg. A set screw or similar arrangement is provided for temporarily holding the legs in the bracket so that the legs remain in place while the blind is tilted to its upright position.

The hunter's compartment comprises a lower section secured to the leg brackets and an upwardly telescoping upper section. In the hunting position, the upper section is spaced from the lower section by a distance sufficient to create window openings through which the hunter may look and shoot. When it is desired to collapse the hunter's compartment, as during transport or during a non-hunting period, the upper and lower compartments are telescoped toward each other to effectively close the window openings and prevent the entrance of owls, skunks or other pests. Additionally, closing the blind substantially reduces deterioration of the blind due to normal weathering thereby lengthening its useful life.

It is accordingly an object of this invention to provide a game blind which provides a simplified supporting arrangement for a hunter's compartment.

Another object of this invention is to provide a game blind including a hunter's compartment which is telescopingly movable between an open hunting position and a closed storage position.

Other objects and advantages of this invention will become more fully apparent as this description proceeds, reference being made to the accompanying drawings and appended claims.

IN THE DRAWINGS

Figure 1:
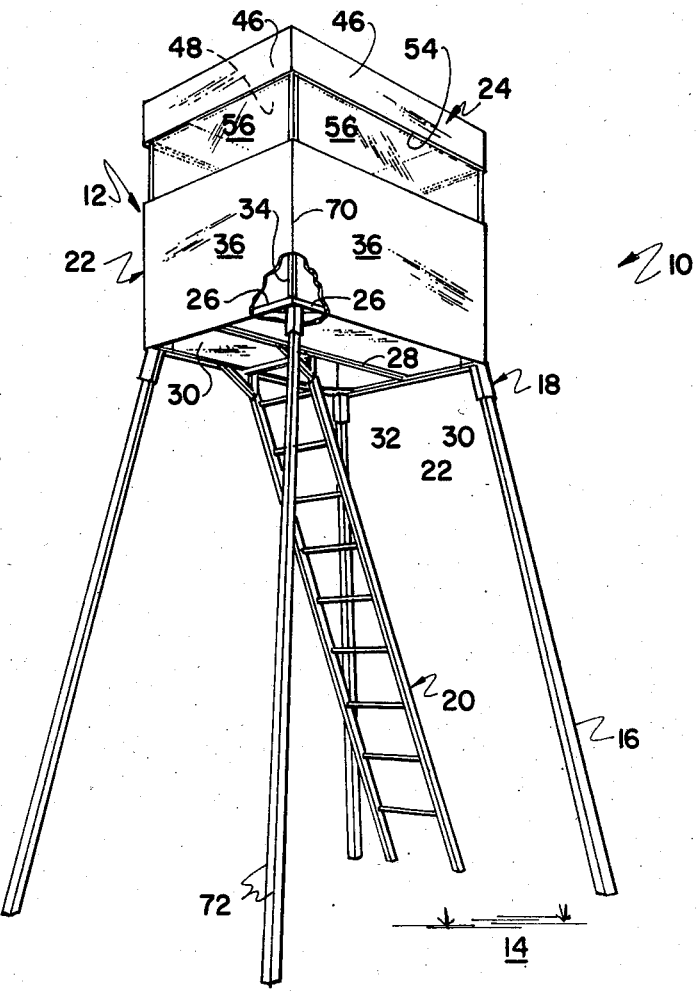
FIG. 1 is an isometric view of a game blind in accordance with the principles of this invention.
Figure 2:
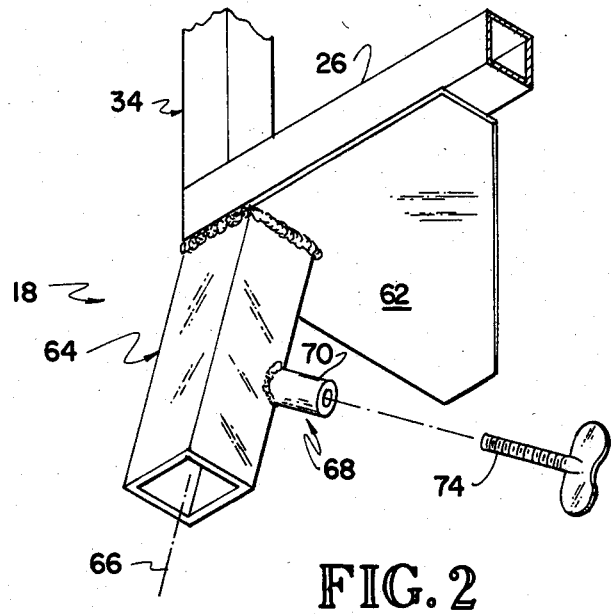
FIG. 2 is an enlarged isometric view of a leg bracket of this invention.

Referring to FIGS. 1 and 2 there is illustrated a game blind 10 comprising a hunter's compartment 12 which is elevated above a ground surface 14 by a plurality of legs 16. The legs 16 are connected to the hunter's compartment 12 by a plurality of brackets 18. A ladder 20 extends between the hunter's compartment 12 and the ground 14 to allow a hunter to climb into the hunter's compartment 12.

The hunter's compartment 12 includes a lower section 22 and an upper section 24 telescopingly received therein. The lower section 22 includes a rectilinear base defined by a plurality of lower beams 26 extending about the periphery thereof. The lower beams 26 may be of any suitable type and are conveniently sections of square tubing as shown best in FIG. 2. A supplementary beam 28 extends across the base as shown best in FIG. 1. Suitable flooring 30, such as plywood or the like, may be secured between the beams 26, 28 leaving an opening 32 to allow entrance into the hunter's compartment 12.

Figure 3:
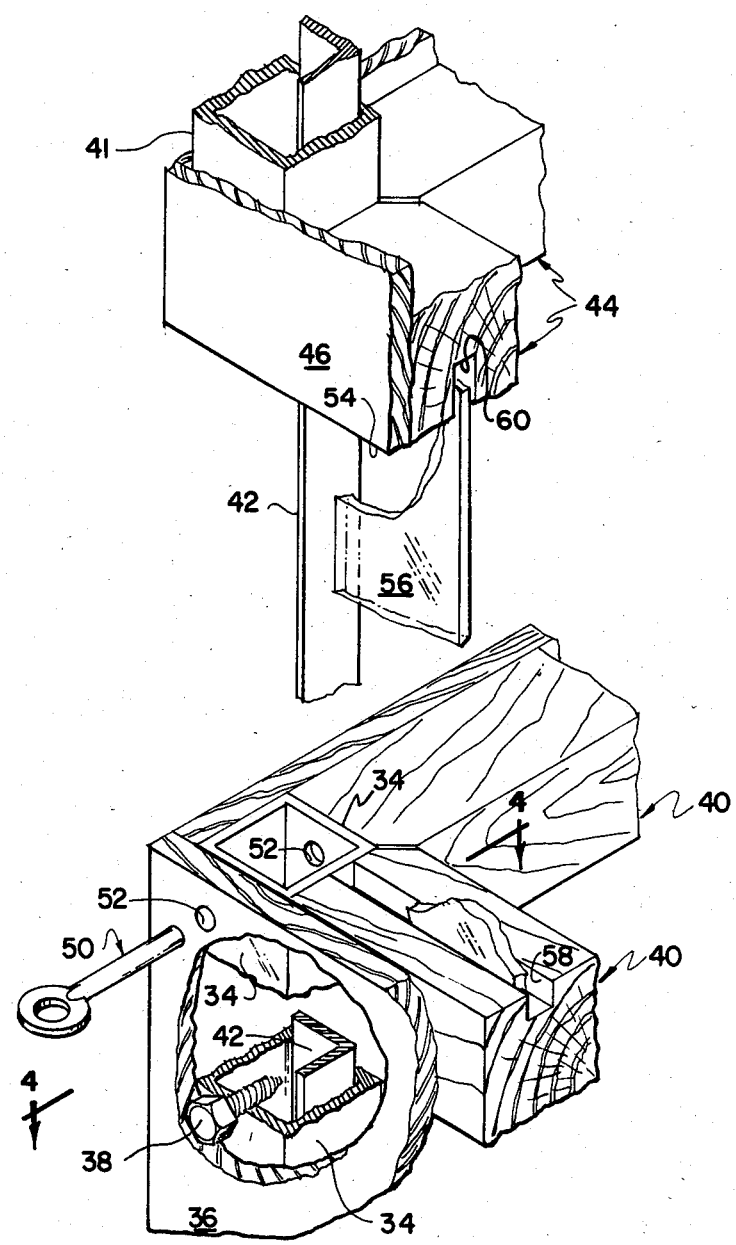
FIG. 3 is an enlarged exploded isometric view, certain parts being broken away for clarity of illustration, illustrating the telescoping relation between the upper and lower portions of the hunter's compartment.

A plurality of uprights 34, which are preferably sections of square tubing, extend upwardly from the juncture of the lower beams 26 and provide the corners of the hunter's compartment 12. Suitable sheathing 36, such as plywood or the like, may be affixed to the uprights 34 by fasteners 38 as shown best in FIG. 3. Wooden beams 40 extend between the uprights 34 and comprise part of the upper end of the lower compartment section 22.

The upper compartment section 24 comprises a plurality of corner posts 41 which are desirably of square tubing. Secured in the lower end of the corner posts 41, as by welding or the like, is an angle iron member 42 received in the square tubing upright 34. Lower wooden beams 44 extend about the periphery of the upper compartment section 24 and are secured to the uprights 41 in any suitable manner. Sheathing 46, such as plywood or the like, is secured to the beams 44 in any suitable manner. Roofing 48 covers the top of the upper compartment section 24.

Figure 4:
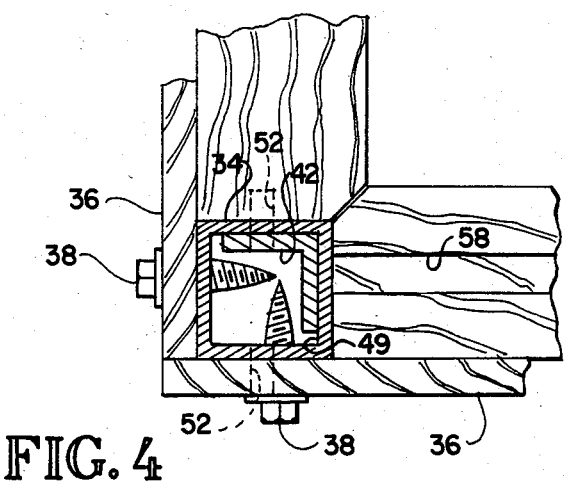
FIG. 4 is an enlarged cross-sectional view of FIG. 3 taken along line 3—3 as viewed in the direction shown by the arrows.

As shown in FIG. 4, the fasteners 38 extend into the square tubing upright 34 and partially define an L-shaped slot 49 for receiving the angle iron telescoping member 42.

The upper compartment section 24 may be held in its elevated hunting position in any suitable manner, as by the use of one or more braces (not shown) supporting the lower beams 40 from the upper beams 44. In the alternative, one or more pins 50 may be inserted through openings 52 in the lower compartment section 22 and similar openings (not shown) in the uprights 42.

With the upper compartment section 24 in its elevated or hunting position, it will be seen that the beams 40, 44 are spaced apart to provide an opening 54 through which the hunter may look and shoot. Desirably, the opening 54 is at least partially closed by transparent panes 56 to afford protection against the weather. The panes 56 are supported in aligned slots 58, 60 in the beams 40, 44. It will accordingly be evident that the panes 56 on one side of the compartment 12 may be slid past one another to provide an opening through which the hunter may extend a rifle. It will also be noted, from FIG. 3, that the slot 60 is substantially deeper than the slot 58. This allows the panes 56 to be removed, by first elevating them into the slot 60 and then swinging the lower end out of alignment with the slot 58. This manifestly allows the upper compartment section 24 to be collapsed into the lower transport position, by removing the load transferring mechanism, such as the pin 50.

An important feature of this invention is that the legs 16 are free of interconnecting braces. The elimination of these heretofore believed necessary components allows the construction of a relative inexpensive game blind which is easy to assemble and erect and which is surprisingly sturdy. To these ends, the brackets 18 are provided. The brackets 18 comprise a planar metallic base 62 which is secured in any suitable fashion to the lower beams 26. It will be seen that the bases 62 act as a gusset to stablize the beams 26 and thereby prevent the base of the lower compartment section 22 from racking. Secured to the base 62 is a section 64 of square tubing. As will be evident from FIGS. 1 and 2, the tubing sections 64 define the axes 66 of the legs 16. The legs 16 preferably comprise elongate square tubing sections which are more-or-less closely received in the blind socket provided by the tubing sections 64. The amount of tolerance between the sections 64 and the leg 16 is subject to substantial variation. The real requirement is for a load transmitting connection between the section 64 and the leg 16. The axes 66 of the legs 16 are seen to be downwardly diverging so that, when the blind 10 is in its upright position, the load of the blind 10 and its occupants tends to splay the legs 16.

During the erection of the blind 10, there is some tendency for the legs 16 to fall out of the sockets 18, particularly when the blind is being tilted upwardly. To avoid this difficulty, there is provided means 68 for temporarily securing the legs 16 in the bracket 18. The securing means 18 conveniently comprises an interiorly threaded boss 70 which receives a set screw 74 for binding the leg 16 in the tubing section 64.

It is preferred that the tubing sections 64 be oriented so that an edge thereof is in alignment, i.e. is coplanar, with a corner 70 of the lower compartment section 22. This orients the edge 72 of the legs 16 so that bending of the legs 16 is doen "edge-on." It can be shown that square members are easier to bend when the plane of the bending axis is parallel to the flat sides of the square member. By orienting the square legs 16 with the edge 72 as shown, the legs 16 are stiffer.

Although the legs 16 are preferably square and oriented as shown, it will be seen that the leg 16 may be of round tubing with the set screw 74 trapping the leg 16 in the V-shaped surface provided by the section 64.

Although the invention has been described in its preferred form with a certain degree of particularity, it is understood that the present disclosure is only by way of example and that numerous changes in the details of construction and in the combination and arrangement of parts may be resorted to without departing from the spirit and scope of the invention as hereinafter claimed.

I claim:

1. An elevated game blind, comprising
   a platform having a rectilinear base providing four corners and a hunter's compartment supported thereon, the base having a pair of intersecting beams at each corner;
   a plurality of elongate legs and means for arranging the legs in diverging load supporting relation relative to the platform, the arranging means comprising
   a bracket on each corner of the base, each of the brackets having a planar metal section secured to the pair of intersecting beams adjacent a corner and a section of elongate rigid square tubing free of movable parts, the tubing section being affixed to the metal section, the tubing sections defining a plurality of downwardly diverging axes;
   the legs being received in the square tubing sections for unobstructed movement along the axes and being free of interconnecting braces;
   means for securing the legs in the square tubing sections during erection, the securing means comprising an interiorly threaded boss opening into the inside of the square tubing section and a set screw extending through the boss; and
   a ladder extending from the base toward an underlying ground surface.

2. The game blind of claim 1 wherein the elongate legs are of square cross-section.

3. The game blind of claim 2 wherein the square legs are received in the square tubing sections so that an edge of the leg aligns with an edge of the square tubing section.

4. The game blind of claim 3 wherein an edge of each leg is aligned with each corner of the base.

5. The game blind of claim 1 wherein the threaded boss provides an axis intersecting an edge of the square tubing section for forcing the leg toward a bight provided by the tubing sections.

6. A game blind, comprising
   a hunter's compartment including a lower section providing a closed rigid exterior wall, an upper section providing a closed rigid exterior wall and a plurality of elongate vertical columns for supporting the upper section from the lower section;
   means mounting each of the elongate vertical columns for telescoping movement for mounting the upper section for bodily downward linear movement relative to the lower section between a first collapsed position and a second elevated position providing a space between the upper and lower sections;
   means for securing the sections in the second position; and
   a plurality of legs elevating the hunter's compartment off an underlying ground surface.

7. The game blind of claim 6 further comprising a ladder extending from adjacent the hunter's compartment toward the ground surface.

8. The game blind of claim 6 further comprising a plurality of transparent panes and means removably mounting the panes in the space between the upper and lower sections in the second position thereof.

9. The game blind of claim 8 wherein the exterior wall of the upper section comprises a polygonal structure having a plurality of planar wall portions, the panes residing in the plane of one of the wall portions in an assembled condition of the game blind.

10. A game blind comprising
a hunter's compartment including a lower compartment section having corner members of hollow square cross-section, an upper compartment section having corner members of L-shaped cross-section;
means mounting the upper section for movement relative to the lower section between a first collapsed position and a second elevated position providing a space between the upper and lower sections, the mounting means comprising the corner members, the L-shaped member being received in the hollow square member.

11. The game blind of claim 10 wherein the lower compartment comprises sheathing spanning the corner members and threaded fasteners extending through the sheathing into the hollow square corner members, the threaded fasteners defining an L-shaped slot with the square corner members for receiving the L-shaped corner member.

* * * * *